United States Patent
Sanford (10) Patent No.: US 10,426,154 B2
(45) Date of Patent: Oct. 1, 2019

(54) UNIT FOR INTERCEPTING AND CAPTURING CRAWLING INSECTS AND ALIKE AND FOR MONITORING THEIR PRESENCE

(71) Applicant: 1st Defence Industries Ltd., Abbotsford (CA)

(72) Inventor: Randall Sanford, Abbotsford (CA)

(73) Assignee: Garden Hunter Solutions Inc., Abbotsford, BC (CA)

( * ) Notice: Subject to any disclaimer, the term of this patent is extended or adjusted under 35 U.S.C. 154(b) by 54 days.

(21) Appl. No.: 15/284,712

(22) Filed: Oct. 4, 2016

(65) Prior Publication Data

US 2018/0055034 A1 Mar. 1, 2018

(30) Foreign Application Priority Data

Sep. 1, 2016 (CA) ..................... 2940940

(51) Int. Cl.
*A01M 1/10* (2006.01)
*A01M 1/14* (2006.01)
*A01M 1/02* (2006.01)

(52) U.S. Cl.
CPC .............. *A01M 1/14* (2013.01); *A01M 1/026* (2013.01); *A01M 1/103* (2013.01)

(58) Field of Classification Search
CPC .......... A01M 1/00; A01M 1/10; A01M 1/103; A01M 1/14
USPC ........................... 43/107, 109, 114, 121, 123
See application file for complete search history.

(56) References Cited

U.S. PATENT DOCUMENTS

| | | | | |
|---|---|---|---|---|
| 134,444 A | * | 12/1872 | Stell | 131/235.1 |
| 970,528 A | * | 9/1910 | Miller | 43/121 |
| 1,024,767 A | * | 4/1912 | Dempster | 43/121 |
| 4,423,564 A | * | 1/1984 | Davies et al. | A01M 1/026 43/121 |
| 4,698,934 A | * | 10/1987 | Gonzalez | A01M 1/10 43/121 |
| 5,090,153 A | * | 2/1992 | Mullen | A01M 1/026 43/114 |
| 5,619,952 A | * | 4/1997 | Walker | A01K 5/0142 119/61.53 |
| 5,771,628 A | * | 6/1998 | Nobbs | A01M 1/14 43/121 |
| 5,802,761 A | * | 9/1998 | Demarest | A01M 1/2011 43/121 |
| 6,618,983 B1 | * | 9/2003 | Spragins | A01M 1/14 43/107 |
| 6,651,378 B2 | * | 11/2003 | Baker | A01M 1/2005 43/121 |
| 6,998,133 B2 | * | 2/2006 | Simpson | A01M 1/02 424/409 |

(Continued)

*Primary Examiner* — Marc Burgess
*Assistant Examiner* — Michael A. Fabula
(74) *Attorney, Agent, or Firm* — Miller Thomson LLP; Tai W. Nahm (57) ABSTRACT

The unit comprises an engageable-releasable combination of a receptacle-basis on which a closing-carrying lid is superimposed. Once engaged, a circular opening between a top extending from an upper end of outer wall of receptacle-basis support and a bottom, horizontal flat surface of closing-carrying lid is formed. An entrapment cavity in an interior of receptacle-basis support for captured crawling insects is established.

8 Claims, 6 Drawing Sheets

(56) References Cited

U.S. PATENT DOCUMENTS

| | | |
|---|---|---|
| 8,146,290 B1 | 4/2012 | Telly |
| 8,789,309 B2 | 7/2014 | Fabry |
| 8,813,419 B2 | 8/2014 | Schneidmiller et al. |
| 8,966,812 B2 | 3/2015 | McKnight |
| 8,973,300 B1 | 3/2015 | Smith et al. |
| 9,253,973 B2 | 2/2016 | McKnight et al. |
| 9,386,763 B2* | 7/2016 | Vasudeva ............ A01M 1/023 |
| 9,451,761 B2* | 9/2016 | Messina ............ A01M 1/2011 |
| 9,713,326 B2* | 7/2017 | Miller ............ A01M 1/2011 |
| 9,743,654 B2* | 8/2017 | Peden ............ A01M 1/10 |
| 2004/0068918 A1* | 4/2004 | Weiser ............ A01M 25/008 |
| | | 43/121 |
| 2005/0091911 A1* | 5/2005 | Matts ............ A01M 1/026 |
| | | 43/131 |
| 2009/0282728 A1* | 11/2009 | McKnight ............ A01M 1/026 |
| | | 43/109 |
| 2011/0047860 A1* | 3/2011 | Black ............ A01M 1/02 |
| | | 43/123 |
| 2011/0072712 A1* | 3/2011 | Black ............ A01M 1/02 |
| | | 43/123 |
| 2011/0107654 A1* | 5/2011 | Wieler ............ A01M 1/2011 |
| | | 43/131 |
| 2012/0066960 A1* | 3/2012 | Pryor ............ A01M 1/2011 |
| | | 43/131 |
| 2012/0204476 A1* | 8/2012 | Frisch ............ A01M 1/023 |
| | | 43/114 |
| 2012/0246998 A1* | 10/2012 | Vasudeva ............ A01M 1/023 |
| | | 43/114 |
| 2012/0291337 A1* | 11/2012 | Curcio ............ A01M 1/14 |
| | | 43/114 |
| 2013/0111801 A1* | 5/2013 | White ............ A01M 1/103 |
| | | 43/109 |
| 2013/0180161 A1* | 7/2013 | Vasudeva ............ A01M 1/103 |
| | | 43/114 |
| 2013/0180162 A1* | 7/2013 | Vasudeva ............ A01M 1/023 |
| | | 43/123 |
| 2013/0269238 A1* | 10/2013 | Bronk ............ A01M 1/223 |
| | | 43/112 |
| 2013/0318860 A1* | 12/2013 | Zhang ............ A01M 1/14 |
| | | 43/114 |
| 2013/0318861 A1* | 12/2013 | Roeder ............ A01M 1/103 |
| | | 43/123 |
| 2014/0215898 A1* | 8/2014 | Hsu ............ A01M 29/34 |
| | | 43/121 |
| 2014/0237892 A1* | 8/2014 | Peden ............ A01M 1/10 |
| | | 43/109 |
| 2014/0259879 A1* | 9/2014 | Logsdon ............ A01M 1/2011 |
| | | 43/114 |
| 2015/0230448 A1* | 8/2015 | Smith ............ A01M 1/023 |
| | | 43/121 |
| 2015/0305318 A1* | 10/2015 | Moriarty ............ A01M 1/02 |
| | | 43/113 |
| 2016/0095303 A1* | 4/2016 | Bronk ............ A01M 1/223 |
| | | 43/112 |
| 2016/0100568 A1* | 4/2016 | Miller ............ A01M 1/2011 |
| | | 43/131 |

* cited by examiner

UNIT FOR INTERCEPTING AND CAPTURING CRAWLING INSECTS AND ALIKE AND FOR MONITORING THEIR PRESENCE

CROSS-REFERENCE TO RELATED-APPLICATION

This application claims the benefit of priority on the basis of Canadian Patent Application No. 2,940,940 filed on Sep. 1, 2016

I. BACKGROUND OF THE INVENTION

1. Definition of the Invention

The present invention relates, in general, to traps for crawling insects and alike and, more specifically, to a unit for intercepting and capturing crawling insects and alike and for monitoring their presence.

2. Description of the State of the Art

Among the crawling insects (bed bugs, ants, cockroaches, spiders, beetles etc.), bed bugs always cause a greater nuisance. They are predominant in apartment buildings and in hotels. A significant increase of national and international travel contributes greatly to their propagation. Generally, one can say that the infestation with bed bugs in new places is the result of relocation of furniture and belongings.

Sticky material applied to a base of an interior of a trap for bed bugs is sometimes combined with an attractant such as methanol, carbon dioxide, or others to lure bed bugs onto a sticky interior of a trap. Basically, so far it was proven that the most efficient attractant is a human. Concerning the efficiency of attractants, this is still considered controversial. The requirement of frequent supply of attractants into traps constitutes a nuisance, while the evaporation of chemical products used as attractants is considered noxious, toxic.

For example, U.S. Pat. No. 9,253,973 granted on Feb. 9, 2016 to McKnight et al. for a "Crawling Arthropod Intercepting Device and Method" discloses a device placed under a supporting leg of furniture, which device comprises an upstanding, exterior climbable surface for bed bugs to climb and first and second pitfall traps and an inner receptacle. The main shortcomings of the above device reside in the lack of a closing lid that could have been used to conceal the disgusting view of captured bugs, especially in hotel rooms. Another shortcoming of the device is due to the fact that children are able to see the captured bed bugs and are tempted to touch them.

Yet another shortcoming of the device is due to the fact that a bottom of a furniture leg is intended to touch the lowest surface of the inner receptacle. Thus, the available space for captured bed bugs is appreciably reduced, which requires larger overall dimensions of the device.

Another example is U.S. Pat. No. 8,966,812, granted on Mar. 3, 2015 to McKnight for a "Trap for Bed Bugs and like". This patent described a climb-up pitfall bed bug trap. The trap is comprised of a rough exterior surface which makes contact with a floor or a counter surface. The surface provides an upward sloping climbing wall that enables bed bugs to reach a pitfall precipice at a top of upward climbing wall. The precipice is a narrow surface that connects the exterior surface to a smooth, slippery downward interior surface. The latter surface abuts a bottom of a receptacle of the trap.

A central stage for placing attractants is provided. In one embodiment of the invention, a heat source and a carbon dioxide source are provided. In another example, use is made of a combination of (a) L-lactic acid, and (b) a fatty acid selected from the group consisting of: (1) propionic acid, (2) butyric acid, and (3) valeric acid. The supply of sufficient and continuous heat and/or $CO_2$ as an attractant in hotel rooms constitutes an important logistical requirement, especially when the hotel has a large number of rooms. Furthermore, the evaporation of chemical attractants with or without scents could be undesirable, repulsive and, sometimes, harmful.

II. SUMMARY OF THE INVENTION

In order to eliminate, or at least to alleviate the shortcomings of the known traps for bed bugs, the following objectives were considered:

A first objective of the present invention is to develop a sturdy, reusable unit which can be easily dismounted for opening and inspecting, discharging the captured crawling insects and for adding/replacing an adhesive pad.

A second objective of this invention is to devise a unit adaptable to support every leg of furniture items.

A third objective of this invention is to design such an unit which, during its use, does not expose captured insects, thereby avoiding an unpleasant, disgusting view.

A fourth objective of this invention is to devise a covered unit which prevents children from touching the captured insects.

A fifth objective of the present invention is to create a passive unit which provides a quick, inexpensive way to monitor and find new infestations, one of the most difficult task of preventing the latter.

Basically, the unit for intercepting and capturing crawling insects and alike and for monitoring their presence comprises a releasable combination of a receptacle-basis support and a closing-carrying lid superimposed on a top of the receptacle-basis support;

the receptacle-basis support incorporates a lower, horizontal flat base, generally circular and adapted for resting on a floor or on ground;

an outer wall extending upwardly and inwardly from the lower, horizontal flat base and having, generally, when laterally viewed, a frustoconical-like shape; a generatrice (not shown) of said outer wall forming an obtuse, external angle with the lower, horizontal flat base, the outer wall performing a role of an angled ramp and being covered with asperities is creating a climbing rough texture surface, tangible attractive for crawling insects;

an inner wall extending downward and outward from the top and forming an external obtuse angle with the lower, horizontal flat base, the inner wall having a slippery, glassy surface;

four cylindrical solid studs, all positioned on a circular circumference and having the same size, are equally spaced among themselves and equidistant from the inner wall;

the four cylindrical solid studs extending upwards from the lower, horizontal flat base and protruding vertically above a horizontal plan incorporating said top;

a lower carrier sleeve for landing, hollow cylinder-like shaped, jutting out of the lower, horizontal flat base and having a topmost surface coplanar with the top; a partially obstructing, horizontal wall, disposed in an interior of the lower carrier sleeve for landing and retracted from the topmost surface and also from a back surface of the lower, horizontal flat base is traversed by a quadrilateral aperture; a circular depression in the back surface of the lower, horizontal flat base forming a zone encompassing the quadrilateral aperture;

the closing-carrying lid, viewed from a bottom, incorporating:

four hollow cylinders vertically projecting out from a bottom, horizontal flat surface of the closing-carrying lid, all four hollow cylinders being positioned to assure a corresponding coaxiality with the four cylindrical solid studs and having an internal diameter compatible with an external diameter of the four cylindrical solid studs so that an easy sliding is assured; a height of each one of the four hollow cylinders being basically shorter than a height of the four cylindrical solid studs;

an upper carrier sleeve for landing, hollow cylinder-like shaped and jutting out of a bottom, horizontal flat surface of closing-carrying lid and generally having a lowermost surface commensurate with a topmost surface of the lower carrier sleeve for landing; and a pair of thin and narrow cantilevered strips providing flexibility and extending downwards from a bottom of the upper carrier sleeve for landing; each one of the pair of thin, narrow, cantilevered strips being provided at a lower end with a spike-spur incorporating an inclined portion protruding outward and toward an exterior.

In one variant, the unit further comprises a pad having a flat, substantially thin, circular shaped and having a circumference commensurate with that of a bottom of the entrapment cavity, on which the pad is superimposed; the pad is formed from a pair of congruent layers: a bottom layer made of cardboard material and a top layer made of an adhesive material;

the pad is traversed by a central aperture commensurate and coaxial with said lower carrier sleeve for landing of the receptacle-basis support and by four apertures commensurated and coaxial with the four cylindrical solid studs of the receptacle-basis support.

III. BRIEF DESCRIPTION OF THE DRAWINGS

The subject matter of the present invention is particularly pointed out and distinctively claimed in the concluding portion of this specification. The invention, however, both in structure and operation may be better understood by reference to the following description taken in conjunction with the subjoined claims and the accompanying drawings of which:

IV. DESCRIPTION OF A PREFERRED EMBODIMENT

As a caveat, it is to be agreed, that terms, such as "top", "bottom" upper", "vertical" "horizontal", "upward", "downward" and "inward" are conventionally employed in the present specification with reference to the normal horizontal position, in which a "UNIT FOR INTERCEPTING AND CAPTURING CRAWLING INSECTS AND ALIKE AND FOR MONITORING THEIR PRESENCE" is used. A reference numeral 10 is generally used to designate the aforementioned unit, which, for the simplification of the specification, will be further called "unit".

The accompanying drawings, as above described, illustrate a preferred embodiment of unit 10, in which like numerals indicate like components and features.

Broadly describing, unit 10 constitutes a combination of a receptacle-basis support 100 and a closing-carrying lid 200, which is positioned on a top of the former and with which is releasable engaged.

Describing now in detail, receptacle-basis support 100 constitutes a monolithic, rigid body.

Receptacle-basis support 100 incorporates:

a lower, horizontal flat base 105, generally circular and adapted for resting on a floor or on ground;

an outer wall 110 extending upwardly and inwardly from lower, horizontal flat base 105 and having, generally, when laterally viewed, a frustoconical-like shape; a generatrice (not shown) of outer wall 110 forming an obtuse, external angle with lower, horizontal flat base 105, outer wall 110 performing the role of an angled ramp and being covered with asperities 115 is creating a climbing rough texture surface, tangible attractive for crawling insects;

a top 120 extending from an upper end of outer wall 110, flat shaped and horizontally disposed and having, substantially, a small size and is ring-like shaped;

an inner wall 125 extending downwards and outwards from top 120 is abutting on lower, horizontal flat base 105; a generatrice (not shown) of inner wall 125 forming an external obtuse angle with lower, horizontal flat base 105; inner wall 125 having a slippery, glassy surface;

four cylindrical solid studs 130, all positioned on a circular circumference and having the same size, being equally spaced among themselves and being equidistant from inner wall 125, are extending upwards from lower, horizontal flat base 105 and protruding vertically above a horizontal plan incorporating top 120;

a lower carrier sleeve for landing 135, hollow cylinder shaped and jutting out of lower, horizontal flat base 105 and having a topmost surface 140 coplanar with top 120; a partially obstructing, horizontal wall 145, disposed in an interior of carrier sleeve top 120 for landing 135 and retracted from topmost surface 140 and from back surface of lower, horizontal flat base 105 is traversed by a quadrilateral aperture 150; a circular depression 155 in back surface of lower, horizontal flat base 105 forming a zone 160 encompassing quadrilateral aperture 150;

Closing-carrying lid 200, like receptacle-basis support 100, constitutes a rigid body.

Closing-carrying lid 200, viewed from a top, incorporates:

an annular area 205 incrementally increasing in height from an external margin;

a circular indented zone 210 circumscribed by annular area 205;

Closing-carrying lid 200, viewed from a bottom, incorporates:

four hollow cylinders 215 vertically projecting out from a bottom, horizontal flat surface 220 of closing-carrying lid 200, all positioned as to assure a corresponding coaxiality with four cylindrical solid studs 130 and having an internal diameter compatible with an external diameter of four cylindrical solid studs 130 so that a easy sliding is assured; a height h1 of each one of the four hollow cylinders 215 is basically shorter than a height h2 of four cylindrical solid studs 130;

an upper carrier sleeve for landing 225, hollow cylinder shaped and jutting out of a bottom, horizontal flat surface 220 of closing-carrying lid 200 and generally having a lowermost surface 230 commensurate with topmost surface 140 of lower carrier sleeve for landing 135; and a pair of thin and narrow cantilevered strips 235 providing flexibility and extending downwards from a bottom of upper carrier sleeve for landing 225; each of the pair of thin, narrow, cantilevered strips 235 being provided at a lower end with a spike-spur 240 including an inclined portion that protrudes outward toward the exterior.

To achieve an engagement of receptacle-basis support 100 with closing-carrying lid 200, four cylindrical solid studs 130 should reach bottoms of four hollow cylinders 215, lower carrier sleeve for landing 135 should contact upper carrier sleeve for landing 225 and spike-spurs 240, provided with inclined portions, should escape and snap behind horizontal flat base 105, after being squeezed during a passage through quadrilateral aperture 150, and, thus, an engagement is achieved; for disengagement, use is made of two fingers (not shown) positioned in circular depression 155 and squeezing spike-spurs 240.

Once engaged, a circular opening O between top 120 extending from an upper end of outer wall 110 of receptacle-basis support 100 and bottom, horizontal flat surface 220 of closing-carrying lid 200 is formed. An entrapment cavity C in the interior of receptacle-basis support 100 for captured crawling insects is established.

Outer wall 110 performing the role of an angled ramp and being covered with asperities 115 provides an attractive, easy upwards climbable surface for crawling insects. After reaching top 120 and by continuing their forward movement, crawling insects attain inner wall 125. The latter obliquely extending downwards and outwards and having a slippery, glassy surface forms a precipice-chute causing the falling of crawling insects into entrapment cavity C wherein they are trapped.

Among crawling insects (bed bugs, ants, cockroaches, spiders, beetles etc.), bed bugs always cause a greater nuisance. They are predominant in apartment buildings and in hotels. A significant increase of national and international travel contributes greatly to their propagation. Generally, one can say that the infestation with bed bugs in new places is the result of relocation of furniture and belongings.

The users of unit 10 are primarily the residents of homes and apartments, hotels and employees of pest control companies who want to detect the presence of crawling insects in specific zones.

Figure 1:
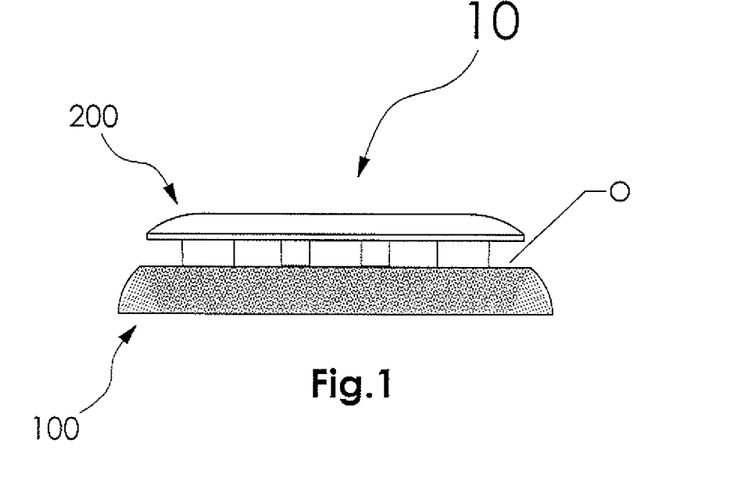
FIG. 1 illustrates a front elevation view the unit for intercepting and capturing crawling insects and alike and for monitoring their presence.
Figure 2:
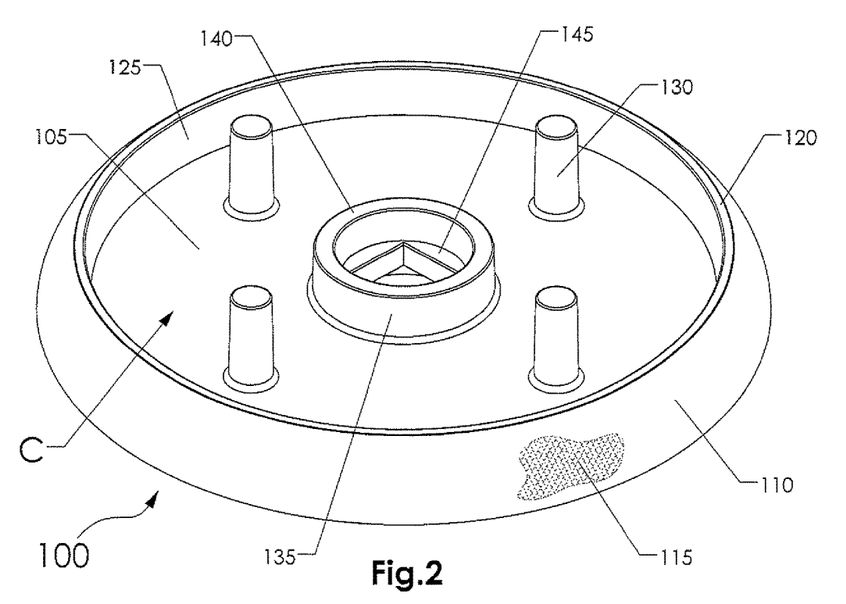
FIG. 2 illustrates a prospective view of a receptacle-basis support of the unit of FIG. 1.
Figure 3:
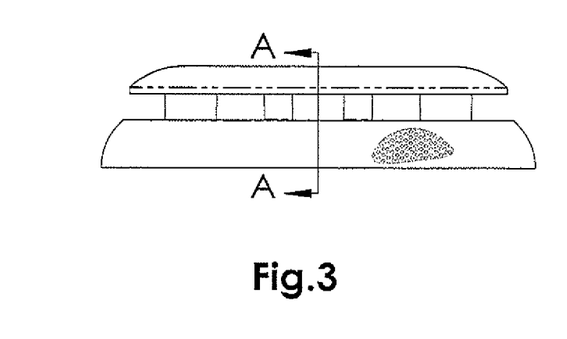
FIG. 3 reproduces FIG. 1 on which line A-A indicates a cross-section.
Figure 4:
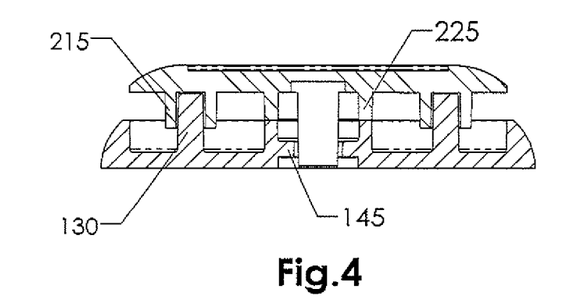
FIG. 4 depicts cross-section A-A of FIG. 3.
Figure 5:
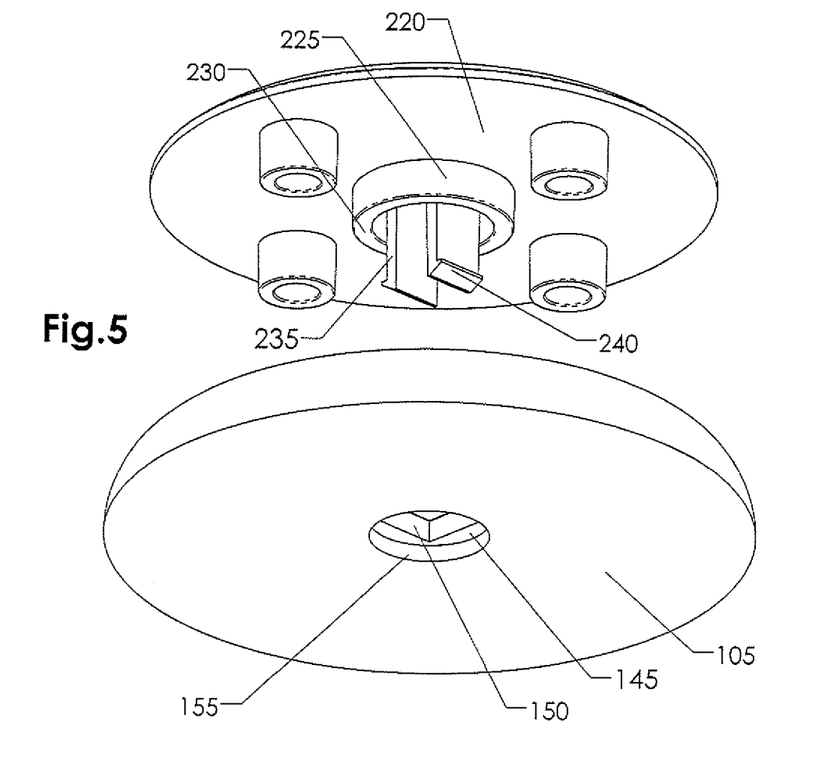
FIG. 5 shows an exploded prospective view of the unit illustrated in FIG. 1.
Figure 6:
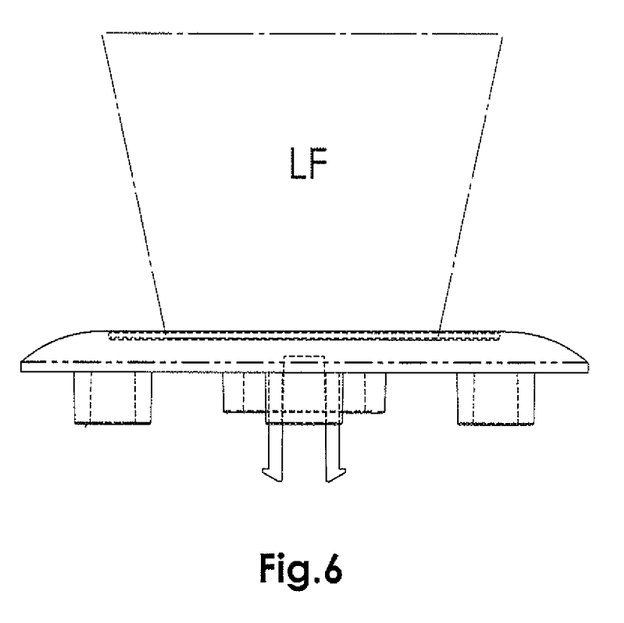
FIG. 6 illustrates a front elevation view of the closing-carrying lid indicated in FIG. 1, showing a leg foot.

Unit 10 is primarily, but not exclusively, conceived and adapted to be positioned under every leg LF of a piece of furniture (bed, sofa, upholstered items, chairs, etc.). Unit 10 can also be placed in kitchens and laundry rooms. When it is mentioned that leg LF is supported by an unit 10, one must infer that it refers to circular, indented zone 210 of closing-carrying lid 200, wherein a bottom of a leg LF is lodged.

To immobilize the bed bugs already captured, various sticky products are used.

Figure 7:
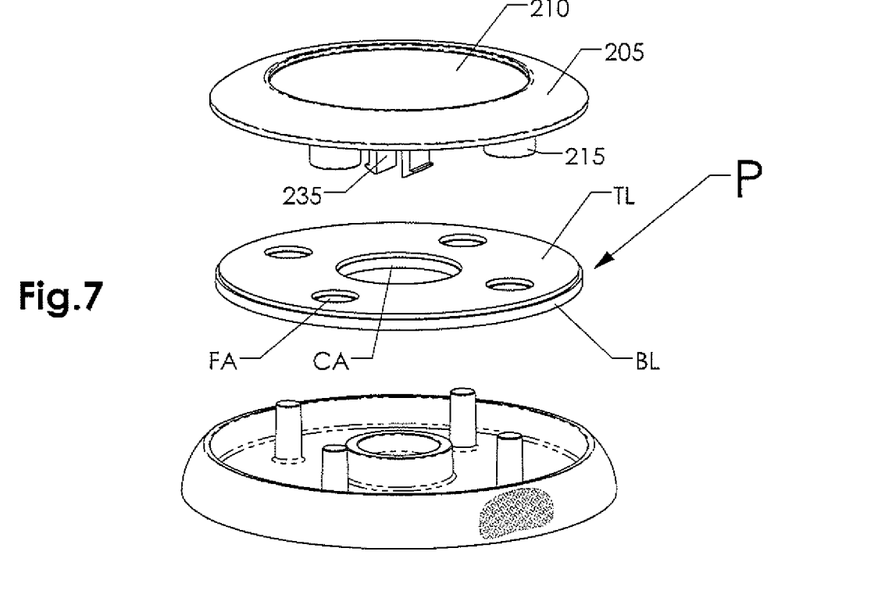
FIG. 7 illustrates an exploded perspective view the unit provided with a pad.

In a variant of the above described unit 10, use is made of a pad P having a flat, substantially thin, circular shape, the latter having a circumference commensurate with that of the bottom of entrapment cavity C, on which it is superimposed. Pad P is formed from a pair of congruent layers: a bottom layer BL made of cardboard material and a top layer TL made of an adhesive material. Besides the fact that pad P is defined by above mentioned circumference, it is also traversed by a central aperture CA commensurate and coaxial with lower carrier sleeve for landing 135 of receptacle-basis support 100 and by four apertures FA commensurate and coaxial with four cylindrical solid studs 130 of receptacle-basis support 100.

As required, a detailed embodiment of the present invention is disclosed herein; however, it is to be understood that the disclosed embodiment is merely exemplary of the invention which may be embodied in various forms. Therefore, specific structural and functional details are not to be interpreted as limiting, but merely as a basis for the claims and as a representative basis for teaching one skilled in the art to variously employ the present invention in virtually any appropriately detailed structure.

The embodiment of the invention in which an exclusive property or privilege is claimed are defined as follows:

1. A unit configured to intercept, capture and monitor the presence of crawling insects and the like, comprising:
    a releasable combination of a receptacle support base and a closing-carrying lid superimposed on a top of said receptacle support base;
    said receptacle support base including:
        a lower, horizontal flat base, which is generally circular and adapted for resting on a floor or on the ground;
        an outer wall extending upwardly and inwardly from said lower, horizontal flat base, said outer wall configured as an angled ramp and being covered with asperities to create a rough textured surface to promote climbing of crawling insects;
        an inner wall extending downward and outward from said top, said inner wall having a slippery, glass-like surface, wherein an entrapment cavity is formed inside the interior wall;
        a plurality of load-bearing studs, all positioned on a circular circumference and having the same size, are equally spaced among themselves and equidistant from said inner wall; said studs extending upwards from said lower, horizontal flat base and protruding vertically above a horizontal plane incorporating said top;
        a lower carrier sleeve in the shape of a hollow cylinder extending upwardly from an upper surface of the flat base at the center thereof and having a topmost surface coplanar with said top of the support base;
        a circular aperture in the lower surface of the horizontal flat base within the inner diameter of the lower carrier sleeve;
        a partially obstructing, horizontal wall, disposed in an interior of said lower carrier sleeve and retracted from said topmost surface and also from a back surface of said lower, horizontal flat base having a quadrilateral aperture connected to the circular aperture of the flat base;
    said closing-carrying lid, viewed from the underside, incorporating;
        a plurality of hollow cylinders vertically projecting out from a horizontal flat surface of said closing-carrying lid, said plurality of hollow cylinders being positioned to correspond coaxially with said plurality of studs of the base and having an internal diameter compatible with an external diameter of said plurality of studs so that the hollow cylinders slide over the corresponding studs;

wherein a height of each one of said plurality of hollow cylinders is shorter than a height of each one of said plurality of studs;

an upper carrier sleeve comprising a hollow cylinder shape extending from the underside of the closing-carrying lid and having a lowermost surface corresponding to the topmost surface of said lower carrier sleeve; and a pair of thin and narrow cantilevered strips extending downwards from a bottom end of said upper carrier sleeve for landing; each one of said pair of thin, narrow, cantilevered strips being flexible and provided at a lower end with a spike-spur incorporating an inclined portion protruding outward and toward an exterior;

wherein the inner surface of the upper carrier sleeve contacts the upper surface of the lower carrier sleeve, the cylinders slide over the corresponding studs, and the strips extend through the circular aperture and the quadrilateral aperture to engage the obstructing wall, thereby securing the lid to the base.

2. The unit of claim 1, further comprising:

a pad having a flat, substantially thin, circular shape and having a circumference commensurate with that of a bottom of the entrapment cavity, on which said pad is superimposed;

said pad being formed from a pair of congruent layers:
a bottom layer made of cardboard material, and
a top layer made of an adhesive material;

said pad being traversed by a central aperture commensurate and coaxial with said lower carrier sleeve of said receptacle support base and by said plurality of apertures corresponding to and coaxial with said plurality of studs of said receptacle support base.

3. An apparatus for intercepting and capturing crawling insects, comprising:

a receptacle base, the receptacle base having an outer wall and an inner support forming an annular entrapment cavity therebetween;

wherein the inner support is a lower carrier sleeve in the shape of a hollow cylinder extending upwardly from an upper surface of the base at the center thereof and having a topmost surface coplanar with a top of the base;

a removable lid adapted to engage the inner support and substantially cover the receptacle base while forming a continuous opening between the lid and the outer wall of the receptacle base into the entrapment cavity;

wherein the lid comprises an upper carrier sleeve comprising a hollow cylinder shape extending from an underside of the lid and having a lowermost surface corresponding to the topmost surface of said lower carrier sleeve; and a plurality of studs positioned between the outer wall and inner support, and adapted to function as support columns between the receptacle base and the lid;

whereby, the upper and lower carrier sleeve surfaces contact one another and in combination with the plurality of studs, maintain the continuous opening between the removable lid and the outer wall of the receptacle base when the lid is attached to the base, and wherein the apparatus is configured to support the weight of an article of furniture placed on the lid of the apparatus; and wherein the upper and lower carrier sleeves each comprise a portion of a releasable attachment means located within the hollow portions thereof to securely couple the base and the lid together.

4. The apparatus of claim 3, wherein the plurality of studs are formed on the receptacle base.

5. The apparatus of claim 3, wherein the receptacle base and the removable lid are adapted to additionally mechanically couple at the plurality of studs which are adapted to function as support columns between the receptacle base and the lid.

6. The apparatus of claim 3, further comprising a replaceable pad adapted to be inserted between the receptacle base and the removable lid.

7. The apparatus of claim 6, wherein the replaceable pad includes an aperture corresponding to the location of the inner support.

8. The apparatus of claim 6, wherein the replaceable pad includes a plurality of apertures to correspond to the location of the inner support and the plurality of studs adapted to function as support columns between the receptacle base and the lid.

* * * * *